United States Patent
Hong et al.

(10) Patent No.: US 11,201,910 B2
(45) Date of Patent: Dec. 14, 2021

(54) NETWORK SECURITY SYSTEM AND METHOD FOR OPERATING SAME

(71) Applicant: HANWHA TECHWIN CO., LTD., Seongnam-si (KR)

(72) Inventors: Young Hun Hong, Seongnam-si (KR); Jin Ook Hur, Seongnam-si (KR); Eun Soo Choi, Seongnam-si (KR)

(73) Assignee: HANWHA TECHWIN CO., LTD., Suwon-si (KR)

( * ) Notice: Subject to any disclaimer, the term of this patent is extended or adjusted under 35 U.S.C. 154(b) by 0 days.

(21) Appl. No.: 17/049,191

(22) PCT Filed: Jun. 14, 2018

(86) PCT No.: PCT/KR2018/006711
§ 371 (c)(1),
(2) Date: Oct. 20, 2020

(87) PCT Pub. No.: WO2019/221328
PCT Pub. Date: Nov. 21, 2019

(65) Prior Publication Data
US 2021/0329059 A1 Oct. 21, 2021

(30) Foreign Application Priority Data

May 18, 2018 (KR) .................. 10-2018-0057322

(51) Int. Cl.
*G06F 15/16* (2006.01)
*H04L 29/08* (2006.01)
(Continued)

(52) U.S. Cl.
CPC .......... *H04L 67/06* (2013.01); *G06F 21/6209* (2013.01); *H04L 61/2015* (2013.01); *H04L 63/0428* (2013.01); *H04L 63/08* (2013.01)

(58) Field of Classification Search
None
See application file for complete search history.

(56) References Cited

U.S. PATENT DOCUMENTS

| 6,070,246 A | 5/2000 | Beser |
| 7,200,678 B1 | 4/2007 | Bettadahalli et al. |
| (Continued) | | |

FOREIGN PATENT DOCUMENTS

| KR | 10-0429901 B1 | 5/2004 |
| KR | 10-2006-0023401 A | 3/2006 |
| (Continued) | | |

OTHER PUBLICATIONS

International Search Report dated Feb. 13, 2019 issued by the International Searching Authority for International Application No. PCT/KR2018/006711 (PCT/ISA/210).
(Continued)

*Primary Examiner* — Quang N Nguyen
(74) *Attorney, Agent, or Firm* — Sughrue Mion, PLLC (57) ABSTRACT

Provided is a network security system including a communication interface that transmits a request for a preset option field value to a Dynamic Host Configuration Protocol (DHCP) server, receives a preset option field value corresponding to the request for the preset option field value from the DHCP server, transmits a request for a preset file to a Trivial File Transfer Protocol (TFTP) server, and receives a preset file corresponding to the request for the preset file from the TFTP server, and a processor that designates a preset location and the preset file of the TFTP server based on the preset option field value, wherein the preset file includes a file different from a file specified in the preset option field value by the DHCP.

18 Claims, 6 Drawing Sheets

(51) Int. Cl.
*H04L 29/12* (2006.01)
*G06F 21/62* (2013.01)
*H04L 29/06* (2006.01)

(56) References Cited

U.S. PATENT DOCUMENTS

| | | | |
|---|---|---|---|
| 9,286,047 B1 | 3/2016 | Avramov et al. | |
| 2002/0138635 A1* | 9/2002 | Redlich | H04L 12/2856 709/229 |
| 2002/0161868 A1* | 10/2002 | Paul | G06F 9/4416 709/221 |
| 2006/0069836 A1* | 3/2006 | Seo | H04L 67/04 710/302 |
| 2006/0143432 A1* | 6/2006 | Rothman | H04L 67/2842 713/2 |
| 2006/0161652 A1* | 7/2006 | Takizawa | H04L 41/00 709/224 |
| 2008/0155245 A1* | 6/2008 | Lipscombe | G06F 9/4416 713/2 |
| 2008/0155657 A1* | 6/2008 | Ogura | H04L 63/08 726/3 |
| 2011/0055422 A1* | 3/2011 | Simcoe | H04L 67/12 709/236 |
| 2012/0303696 A1* | 11/2012 | Kim | H04L 69/40 709/203 |
| 2014/0244797 A1* | 8/2014 | Simcoe | H04L 69/22 709/219 |

FOREIGN PATENT DOCUMENTS

| | | |
|---|---|---|
| KR | 10-0744536 B1 | 8/2007 |
| KR | 10-1584986 B1 | 1/2016 |
| KR | 10-2016-0123902 A | 10/2016 |
| KR | 10-1683013 B1 | 12/2016 |
| KR | 10-1729944 B1 | 4/2017 |
| KR | 10-1762862 B1 | 8/2017 |
| KR | 10-1769447 B1 | 8/2017 |
| KR | 10-1787404 B1 | 10/2017 |

OTHER PUBLICATIONS

Written Opinion dated Feb. 13, 2019 issued by the International Searching Authority for International Application No. PCT/KR2018/006711 (PCT/ISA/237).

* cited by examiner

NETWORK SECURITY SYSTEM AND METHOD FOR OPERATING SAME

CROSS-REFERENCE TO RELATED APPLICATIONS

This application is a National Phase Entry of PCT International Application No. PCT/KR2018/006711 filed on Jun. 14, 2018, which claims priority to Korean Patent Application No. 10-2018-0057322 filed on May 18, 2018, the contents of all of which are incorporated herein by reference in their entirety.

TECHNICAL FIELD

One or more embodiments relate to a network security system that uses a preset option of the Dynamic Host Configuration Protocol (DHCP) standard for various purposes, and an operating method of the network security system.

BACKGROUND ART

The Dynamic Host Configuration Protocol (DHCP) is a protocol that allows a server to automatically provide information such as an Internet Protocol (IP) address, subnet mask, router, Domain Name System (DNS), and the like to a terminal without the need for a user to directly input the terminal's IP address and basic Transmission Control Protocol (TCP)/IP settings.

However, the DHCP, in which the server allocates an IP address in response to a request from the terminal, has a security problem due to a spoofing server or a spoofing terminal.

A secure DHCP, which has been developed to overcome this security problem, requires a separate server and a separate terminal, which is disadvantageous in terms of cost.

Therefore, it is necessary to develop a network security system that is advantageous in terms of cost and provides enhanced security.

DESCRIPTION OF EMBODIMENTS

Technical Problem

One or more embodiments provide a low-cost and high-efficiency network security system and an operating method thereof.

Technical Solution to Problem

According to an embodiment to resolve the problem to be solved by the present disclosure, a network security system includes a communication interface that transmits a request for a preset option field value to a Dynamic Host Configuration Protocol (DHCP) server, receives a preset option field value corresponding to the request for the preset option field value from the DHCP server, transmits a request for a preset file to a Trivial File Transfer Protocol (TFTP) server, and receives a preset file corresponding to the request for the preset file from the TFTP server, and a processor that designates a preset location and the preset file of the TFTP server based on the preset option field value, wherein the preset file includes a file different from a file specified in the preset option field value by the DHCP.

The request for the preset option field value may be included in a DHCP Discover message, and the preset option field value may be included in a DHCP offer message.

The preset option field value may include an option 66 field value and an option 67 field value, and a file specified in the option 67 field value by the DHCP may include a boot file.

The processor may extract IP address information indicating the preset location from the option 66 field value, and extract file identification information indicating the preset file from the option 67 field value, thereby designating the preset location and the preset file.

The file identification information may include one piece of file identification information when a remote boot system is not used, and may include two pieces of file identification information separated by a delimiter, when the remote boot system is used. The one piece of file identification information may include preset file identification information indicating the preset file. The two pieces of file identification information may include the preset file identification information and boot file identification information indicating the boot file, respectively.

The network security system may further include a memory in which a current file is stored, and the processor may compare the preset file with the current file stored in the memory, and when the preset file is different from the current file, replace the current file with the preset file.

The processor may determine whether a path of the preset file is normal, delete the preset file when the path of the preset file is abnormal, and replace the current file with the preset file when the path of the preset file is normal.

The preset option field value may be encrypted by encryption information. The communication interface may receive the encryption information corresponding to the request for the preset option field value from the DHCP server. The processor may designate the preset location and the preset file by decrypting the preset option field value by using the encryption information.

The request for the preset option field value may be included in a DHCP Discover message, and the preset option field value and the encryption information may be included in a DHCP offer message.

The communication interface may transmit, to the DHCP server, a notification that a preset option field value is invalid or a notification that a preset option field value is valid, and receive, from the DHCP server, the preset option field value and encryption-free information, which correspond to the notification that the preset option field value is invalid. The processor may determine whether the encryption information is valid, and when the encryption information is invalid, transmit a notification that the preset option field value is invalid to the DHCP server through the communication interface, and when the encryption information is valid, transmit a notification that the preset option field value is valid to the DHCP server through the communication interface in response to the preset option field value and the encryption-free information.

The notification that the preset option field value is invalid or the notification that the preset option field value is valid may be included in a DHCP Request message, and the communication interface may receive, from the DHCP server, a DHCP Ack message corresponding to a DHCP Request message that includes the notification that the preset option field value is valid.

The encryption information may include at least one of a hash algorithm, a hash value, an encryption key value, and timestamp information, and the timestamp information may include information on a time when encryption and decryption are possible.

The processor may extract authentication information from the preset option field value, and transmit the request for the preset file to the TFTP server through the communication interface when the authentication information is the same as terminal identification information indicating the TFTP server.

The preset file may include a firmware file.

The communication interface may periodically transmit the request for the preset option field value to the DHCP server.

The communication interface may transmit the request for the preset option field value to the DHCP server whenever the network security system is booted.

According to an embodiment to resolve the problem to be solved by the present disclosure, an operating method of a network security system includes transmitting, by a communication interface, a request for preset option field value to a Dynamic Host Configuration Protocol (DHCP) server, receiving, by the communication interface, a preset option field value and encryption information from the DHCP server, the preset option field value and the encryption information corresponding to the request for the preset option field value, designating, by a processor, a preset location and a preset file of a Trivial File Transfer Protocol (TFTP) server, based on the preset option field value, transmitting, by the communication interface, a request for a preset file to the TFTP server, receiving, by the communication interface, a preset file from the TFTP server, the preset file corresponding to the request for the preset file, comparing, by the processor, the preset file with a current file stored in a memory, and when the preset file is different from the current file, replacing, by the processor, the current file with the preset file, wherein the preset file includes a file different from a file specified in the preset option field value by the DHCP.

The operating method may further include determining, by the processor, whether the preset option field value and the encryption information are valid, when the preset option field value and the encryption information are valid, transmitting, by the processor, a notification that the preset option field value is valid to the DHCP server through the communication interface, when the preset option field value and the encryption information are invalid, transmitting, by the processor, a notification that the preset option field value is invalid to the DHCP server through the communication interface, receiving, by the communication interface, the preset option field value from the DHCP server, the preset option field value corresponding to the notification that the preset option field value is invalid, and transmitting, by the processor, a notification that a preset option field value is valid to the DHCP server through the communication interface, in response to preset option field value.

The transmitting of the request for the preset file to the TFTP server may include extracting, by the processor, authentication information from the preset option field value, determining, by the processor, whether the authentication information is the same as terminal identification information indicating the TFTP server, and when the authentication information is the same as the terminal identification information indicating the TFTP server, transmitting, by the communication interface, the request for the preset file to the TFTP server.

According to an embodiment to resolve the problem to be solved by the present disclosure, a network security system includes a communication interface that transmits a request for a preset option field value to a Dynamic Host Configuration Protocol (DHCP) server, receives a preset option field value and encryption information from the DHCP server, the preset option field value and encryption information corresponding to the request for the preset option field value, transmits a request for a preset file to a Trivial File Transfer Protocol (TFTP) server, and receives a preset file corresponding to the request for the preset file from the TFTP server, and a processor that designates a preset location and the preset file of the TFTP server by decrypting the preset option field value by using the encryption information, wherein the encryption information includes at least one of a hash algorithm, a hash value, an encryption key value, and timestamp information, and the timestamp information includes information on a time when encryption and decryption are possible.

Advantageous Effects of Disclosure

According to one or more embodiments of the present disclosure, a low-cost and high-efficiency network security system and an operating method thereof are provided.

BEST MODE

According to an embodiment to resolve the problem to be solved by the present disclosure, a network security system includes a communication interface that transmits a request for a preset option field value to a Dynamic Host Configuration Protocol (DHCP) server, receives a preset option field value corresponding to the request for the preset option field value from the DHCP server, transmits a request for a preset file to a Trivial File Transfer Protocol (TFTP) server, and receives a preset file corresponding to the request for the preset file from the TFTP server, and a processor that designates a preset location and the preset file of the TFTP server based on the preset option field value, wherein the preset file includes a file different from a file specified in the preset option field value by a DHCP.

Mode of Disclosure

As embodiments allow for various changes and numerous embodiments, example embodiments will be illustrated in the drawings and described in detail in the written description. However, this is not intended to limit embodiments to particular modes of practice, and it is to be appreciated that all changes, equivalents, and substitutes that do not depart from the spirit and technical scope of the inventive concept are encompassed in embodiments. In the description of embodiments, certain detailed explanations of the related art are omitted when it is deemed that they may unnecessarily obscure the essence of the inventive concept.

In the following embodiments, while such terms as "first," "second," etc. may be used to describe various components, such components must not be limited to the above terms. The above terms are used only to distinguish one component from another.

The terms used in the present specification are merely used to describe example embodiments, and are not intended to limit embodiments. An expression used in the singular encompasses the expression of the plural, unless it has a clearly different meaning in the context. In the present specification, it is to be understood that the terms such as "including," "having," and "comprising" are intended to indicate the existence of the features, numbers, steps, actions, components, parts, or combinations thereof described in the specification, and are not intended to preclude the possibility that one or more other features, numbers, steps, actions, components, parts, or combinations thereof may exist or may be added.

Embodiments of the present disclosure including various processors described herein may be represented by functional block configurations and various processing steps. These functional blocks may be implemented with various numbers of hardware or/and software configurations that perform specific functions. For example, embodiments of the present disclosure may employ direct circuit configurations such as memory, processing, logic, look-up tables, and the like, in which various functions may be executed by one or more microprocessors or other control devices. Similar to that the components of an embodiment of the present disclosure may be implemented with software programming or software elements, an embodiment of the present disclosure may include various algorithms that are implemented with data structures, processes, routines or a combination of other programming components, and may be implemented as programming or scripting language such as C, C++, Java, assembler, or the like. Functional aspects may be implemented with an algorithm executed in one or more processors. In addition, embodiments of the present disclosure may employ related-art techniques for electronic environment setting, signal processing, and/or data processing. Terms such as "mechanism," "element," "means," and "configuration" may be widely used, and are not limited to mechanical and physical configurations. The terms may include a meaning of a series of routines of software in connection with a processor or the like. Further, various communication interfaces described herein may include any one or combination of a digital modem, a radio frequency (RF) modem, a WiFi chip, and related software and/or firmware.

Various embodiments of the present disclosure will be described in detail below with reference to the accompanying drawings.

Figure 1:
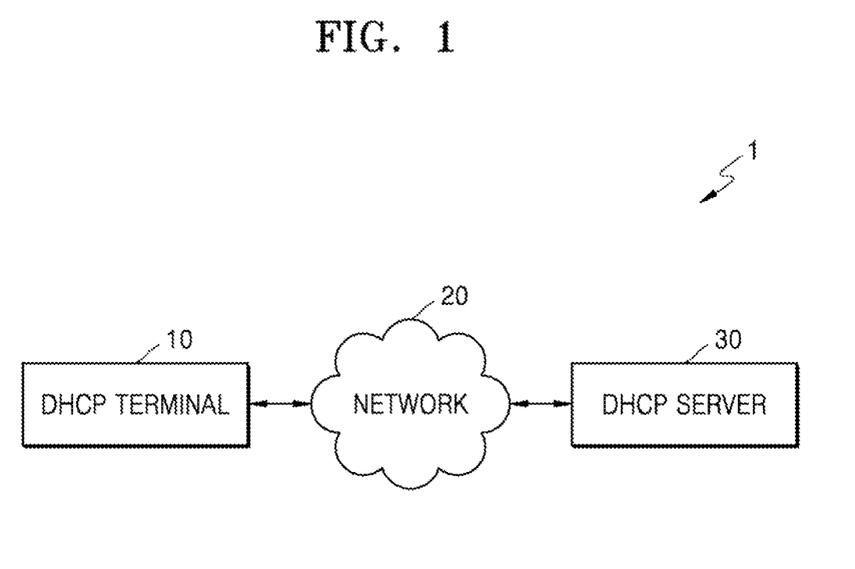
FIG. 1 is a diagram schematically illustrating a network security system, according to an embodiment.

FIG. 1 is a diagram schematically illustrating a network security system 1, according to an embodiment.

Referring to FIG. 1, the network security system 1 according to an embodiment includes a Dynamic Host Configuration Protocol (DHCP) terminal 10, a network 20, and a DHCP server 30.

The DHCP terminal 10 may be connected to the DHCP server 30 through the network 20.

Each of the DHCP terminal 10 and the DHCP server 30 may be at least one. For example, n DHCP terminals 10 may be connected to one DHCP server 30 through the network 20.

The DHCP terminal 10, by using the DHCP, may automatically receive an Internet Protocol (IP) address from the DHCP server 30 through the network 20.

The DHCP terminal 10 may be, for example, a network camera, an IP telephone, a personal computer, a tablet computer, or a mobile terminal, but is not limited thereto.

The DHCP terminal 10 sends and receives messages to and from the DHCP server 30 through the network 20.

In detail, the DHCP terminal 10, to receive an IP address from the DHCP server, sends a DHCP Discover message and a DHCP Request message to the DHCP server 30, and receives a DHCP Offer message and a DHCP Ack message from the DHCP server 30.

The DHCP Discover message is a message sent from the DHCP terminal 10 to the DHCP server 30. The DHCP Discover message is a message for finding the DHCP server 30 and may be a broadcast message. The DHCP Discover message may include a Media Access Control (MAC) address of the DHCP terminal 10, a request for a preset option field value of the DHCP, and the like.

The DHCP Offer message is a message sent from the DHCP server 30 to the DHCP terminal 10. The DHCP Offer message is a message in response to the DHCP Discover message, and may be a unicast message or a broadcast message. The DHCP Offer message includes various network information including a MAC address of the DHCP terminal 10, an IP address scheduled to be allocated to the DHCP terminal 10, an available time of the IP address of the DHCP terminal 10, and identification information of the DHCP server 30, a preset option field value, encryption information, and the like.

The DHCP Request message is a message sent from the DHCP terminal 10 to the DHCP server 30. The DHCP Request message is a message for selecting the DHCP server 30 and may be a broadcast message. The DHCP Request message may include a MAC address of the DHCP terminal 10, an IP address that the DHCP terminal 10 wants to use, identification information of the DHCP server 30, network information that the DHCP terminal 10 wants to use, and a notification of whether a preset option field value is valid.

The notification of whether the preset option field value is valid may be a notification that the preset option field value is valid, a notification that the preset option field value is invalid, or the like.

The DHCP Ack message is a message sent from the DHCP server 30 to the DHCP terminal 10. The DHCP Offer message is the last message of a procedure in which the DHCP terminal 10 receives an IP address from the DHCP server 30, and may be a unicast message or a broadcast message. The DHCP Ack message includes various network information including a MAC address of the DHCP terminal 10, an IP address scheduled to be allocated to the DHCP terminal 10, the available time of the IP address of the DHCP terminal 10, and identification information of the DHCP server 30.

The DHCP terminal 10 may include a request for a preset option field value in the DHCP Discover message, determine whether a preset option field value received from the DHCP server 30 is valid, and include a notification of whether the preset option field value is valid, in the DHCP Request message.

At this time, the DHCP terminal 10, when at least one of the preset option field value and the encryption information received from the DHCP server 30 is invalid, may transmit a notification that the preset option field value is invalid to the DHCP server 30, and when the preset option field value and the encryption information are valid, may transmit a notification that the preset option field value is valid to the DHCP server 30.

Accordingly, in the DHCP terminal 10, sending and receiving messages to and from a spoofing server may be prevented.

The network 20 includes a 3rd Generation Partnership Project (3GPP) network, Long Term Evolution (LTE) network, 5th Generation Partnership Project (5GPP) network, World Interoperability for Microwave Access (WIMAX) network, Internet, Local Area Network (LAN), Wireless LAN, Wide Area Network (WAN), Personal Area Network (PAN), Bluetooth network, satellite broadcasting network, analog broadcasting network, Digital Multimedia Broadcasting (DMB) network, but is not limited thereto.

To provide an IP address to the DHCP terminal 10, the DHCP server 30 receives a DHCP Discover message and a DHCP Request message from the DHCP terminal 10, and sends a DHCP Offer message and a DHCP Ack message to the DHCP terminal 10. Additionally, the DHCP server 30 may send a preset option field value message including a preset option field value and encryption-free information to the DHCP terminal 10.

At this time, the DHCP server 30 may include a preset option field value and encryption information in the DHCP Offer message, and may send a preset option field value message including a preset option field value and encryption-free information to the DHCP terminal 10 in response to a DHCP Request message including a notification that the preset option field value is invalid.

That is, the DHCP server 30 may transmit a preset option field value and encryption information to the DHCP terminal 10 in response to a request for a preset option field value received from the DHCP terminal 10, and may transmit a preset option field value to the DHCP terminal 10 in response to the notification that the preset option field value is invalid, which is received from the DHCP terminal 10.

Accordingly, in the DHCP server 30, sending and receiving messages to and from a spoofing terminal may be prevented.

Meanwhile, the network security system 1 according to an embodiment may perform a pre-operation for upgrading a firmware file of the DHCP terminal 10 and an operation of allocating an IP address to the DHCP terminal 10 at the same time. This may be achieved by using preset options of the DHCP for various purposes. Hereinafter, embodiments in which preset options of the DHCP are used for a purpose other than the original purpose are described in more detail.

Figure 2:
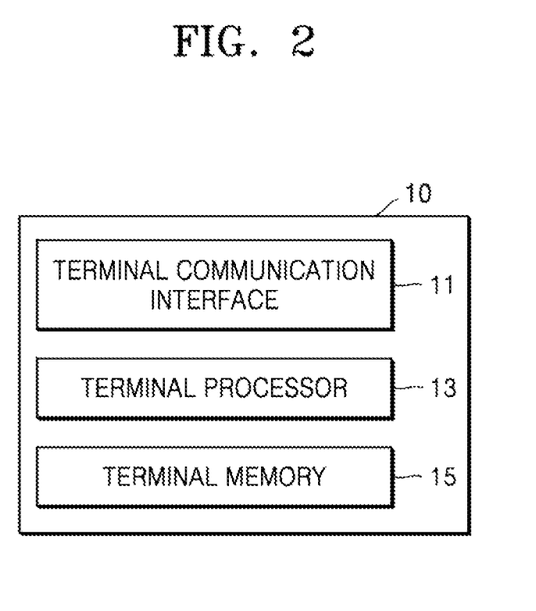
FIG. 2 is a block diagram showing a configuration of a Dynamic Host Configuration Protocol (DHCP) terminal, according to an embodiment.

FIG. 2 is a block diagram showing a configuration of the DHCP terminal 10, according to an embodiment.

Referring to FIG. 2, the DHCP terminal 10 includes a terminal communication interface 11, a terminal processor 13, and a terminal memory 15.

The terminal communication interface 11 transmits a request for a preset option field value to the DHCP server 30.

The request for the preset option field value may be included in a DHCP Discover message.

The request for the preset option field value may be a request for an option 66 field value and an option 67 field value.

That is, the terminal communication interface 11 may send a DHCP Discover message including the request for the option 66 field value and the option 67 field value to the DHCP server 30.

The option 66 field value may mean a Trivial File Transfer Protocol (TFTP) Server Name.

The option 67 field value may mean a Boot File Name.

The terminal communication interface 11 may periodically transmit a request for a preset option field value to the DHCP server 30. The period in which the terminal communication interface 11 transmits a request for a preset option field value to the DHCP server 30 may be determined by the DHCP server 30, but is not limited thereto.

Meanwhile, the terminal communication interface 11 may transmit a request for a preset option field value to the DHCP server 30 whenever the network security system 1 is booted. For example, the terminal communication interface 11 may transmit a request for a preset option field value to the DHCP server 30 whenever the DHCP terminal 10 or the DHCP server 30 is booted.

However, the terminal communication interface 11 may randomly transmit a request for a preset option field value to the DHCP server 30. For example, the terminal communication interface 11 may transmit a request for a preset option field value to the DHCP server 30 according to a notification from the outside. In this case, the notification from the outside, for example, may be a notification to upgrade a firmware file, which is received from a firmware file upgrade server (not shown) or the DHCP terminal 10, but is not limited thereto.

The terminal communication interface 11 receives, from the DHCP server 30, a preset option field value and encryption information, which correspond to the request for the preset option field value.

The preset option field value and the encryption information may be included in the DHCP Offer message.

The preset option field value may include an option 66 field value and an option 67 field value.

The preset option field value may include IP address information, Uniform Resource Locator (URL) information, file identification information, terminal identification information, and the like.

The IP address information, for example, may be in a format such as "192.168.53.180," and the URL information may be in a format such as "http://www.hanwhaaerospace.co.kr." The file identification information, for example, may be in a format such as "snb5004_Series_5.00_171117.img," and the terminal identification information may be in a format such as "YONGHUNHONGO1W."

The option 66 field value, for example, may be IP address information. In this case, the option 66 field value may indicate a preset location in which a preset file is stored.

The option 67 field value, for example, may be file identification information. At this time, the option 67 field value, for example, may indicate the preset file. At this time, the preset file is a file different from a boot file specified in the option 67 field value by the DHCP. The preset file may be, for example, a firmware file. Accordingly, the DHCP terminal 10 may utilize options 66 and 67 of the DHCP for other purposes such as upgrade a firmware file, in addition to the original purpose of booting.

The option 67 field value may include one or more pieces of file identification information. For example, when the DHCP terminal 10 does not use a remote boot system, the option 67 field value may include one piece of file identification information, and when the DHCP terminal 10 uses a remote boot system, the option 67 field value may include two pieces of file identification information that are separated from each other by a delimiter. In this case, the one piece of file identification information may be preset file identification information indicating a preset file, and the two pieces of file identification information may include preset file identification information and boot file identification information that indicates a boot file.

When the DHCP terminal 10 uses the remote boot system, the option 67 field value, for example, may be "boot_loader.bin"?"snb5004_Series_9.99_171117.img." Here, "boot_loader.bin" is boot file identification information, which refers to a file that has the original purpose of the option 67 field value, the "snb5004_Series_9.99_171117.img" is firmware file identification information, which refers to a file that has a purpose other than the original purpose of the option 67 field value, and the "?" may refer to a delimiter for separating the boot file identification information from the firmware file identification information.

The option 66 field value and the option 67 field value may further include terminal identification information. In this case, the terminal identification information may be information indicating a TFTP server 151.

The terminal identification information may be used as authentication information for accessing the TFTP server 151. In other words, when the terminal identification information included in the option 66 field value and the option 67 field value matches the terminal identification information of the TFTP server 151, the DHCP terminal 10 may request the corresponding TFTP server 151 for the preset file stored in the preset location. Accordingly, the access of a spoofing terminal to the TFTP server 151 may be prevented.

Meanwhile, the preset option field value may be encrypted by the encryption information.

The encryption information may be a hash algorithm, a hash value, an encryption key value, and timestamp information, but is not limited thereto. The timestamp information may be information on a time when encryption and decryption are possible.

That is, the terminal communication interface 11 may receive, from the DHCP server 30, a DHCP Offer message including an option 66 field value, an option 67 field value, and encryption information for the option 66 field value and the option 67 field value.

The terminal communication interface 11 transmits a request for a preset file to the TFTP server 151, and receives a preset file corresponding to the preset file request, from the TFTP server 151.

The preset file request, for example, may include a preset location of the TFTP server 151, a preset file stored in the TFTP server 151, and authentication information.

The preset file may be a firmware file, but is not limited thereto.

The terminal communication interface 11 may transmit a notification that the preset option field value is invalid or a notification of whether the preset option field value is valid to the DHCP server 30, and may receive, from the DHCP server 30, the preset option field value and encryption-free information corresponding to the notification that the preset option field value is invalid.

The notification that the preset option field value is invalid or the notification that the preset option field value is valid may be included in the DHCP Request message.

The notification that the preset option field value is invalid may indicate that the preset option field value is invalid or that the preset option field value cannot be decrypted by the encryption information, but is not limited thereto.

The notification that the preset option field value is valid may indicate that the preset option field value is valid and that the preset option field value may be decrypted by the encryption information, but is not limited thereto.

The preset option field value and the encryption-free information, which correspond to the notification that the preset option field value is invalid, may be included in a preset option field value message.

The encryption-free information may be information indicating that the preset option field value is not encrypted by the encryption information.

Meanwhile, the preset option field value message may include a preset option field value. That is, the preset option field value message may not include encryption information and encryption-free information, but may include a preset option field value.

The terminal communication interface 11 may receive, from the DHCP server 30, a DHCP Ack message corresponding to the DHCP Request message that includes a notification that the preset option field value is valid.

The terminal processor 13 designates a preset location and a preset file of the TFTP server 151 based on the preset option field value.

The terminal processor 13, for example, extracts IP address information indicating a preset location of the TFTP server 151 from the option 66 field value, and extracts file identification information indicating a preset file of the TFTP server 151 from the option 67 field value. Thus, the preset location and the preset file may be designated.

Meanwhile, the terminal processor 13 may designate a preset location and a preset file by decrypting the preset option field value by using the encryption information.

The terminal processor 13, for example, may decrypt the option 66 field value and the option 67 field value by using encryption information for the option 66 field value and the option 67 field value, extract IP address information indicating a preset location of the TFTP server 151 from the option 66 field value, and extract file identification information indicating a preset file of the TFTP server 151 from the option 67 field value. Thereby, the preset location and the preset file may be designated.

The terminal processor 13 may determine whether the preset option field value and the encryption information are valid.

For example, when the IP address information included in the preset option field value indicates a preset location of the TFTP server 151, the file identification information included in the preset option field value indicates a preset file stored in a preset location of the TFTP server 151, and the authentication information is correct, the terminal processor 13 may determine that the preset option field value is valid.

On the other hand, when the IP address information included in the preset option field value does not indicate a preset location of the TFTP server 151, the file identification information included in the preset option field value does not indicate a preset file stored in a preset location of the TFTP server 151, and the authentication information is incorrect, the terminal processor 13 may determine that the preset option field value is invalid.

The terminal processor 13 may determine that the encryption information is valid when the preset option field value can be decrypted by the encryption information.

The terminal processor 13 may determine that the encryption information is invalid when the preset option field value cannot be decrypted by the encryption information.

When the preset option field value and the encryption information are valid, the terminal processor 13 may transmit a notification that the preset option field value is valid to the DHCP server 30 through the terminal communication interface 11. In this case, the terminal processor 13 may send a DHCP Request message including a notification that the preset option field value is valid to the DHCP server 30.

When the preset option field value or the encryption information is invalid, the terminal processor 13 may transmit a notification that the preset option field value is invalid to the DHCP server 30 through the terminal communication interface 11. In this case, the terminal processor 13 may send a DHCP Request message including a notification that the preset option field value is invalid to the DHCP server 30.

The terminal processor 13 may transmit a notification that the preset option field value is valid to the DHCP server 30 through the terminal communication interface 11, in response to a preset option field value message including the preset option field value and encryption-free information. In this case, the terminal processor 13 may send a DHCP Request message including a notification that the preset option field value is valid to the DHCP server 30.

Meanwhile, the terminal processor 13 may extract authentication information from the preset option field value. In this case, the terminal processor 13 may extract terminal identification information from the preset option field value.

The terminal processor 13 may compare the preset file received through the terminal communication interface 11 with a current file stored in the terminal memory 15, and when the preset file is different from the current file, may replace the current file with the preset file.

By replacing the current file with a preset file, the terminal processor 13 may upgrade the firmware file of the DHCP terminal 10.

When the preset file is the same as the current file, the terminal processor 13 may finish upgrading the firmware file.

When the preset file is different from the current file, the terminal processor 13 may determine whether the path of the preset file received through the terminal communication interface 11 is normal, and when the path of the preset file is abnormal, may delete the preset file, and when the path of the preset file is normal, replace the current file with the preset file.

At this time, the terminal processor 13 may determine whether the path of the preset file received through the terminal communication interface 11 is normal, and when the path of the preset file is abnormal, may delete the preset file, and when the path of the preset file is normal, replace the current file with the preset file.

The terminal processor 13 may determine whether the path of the preset file is normal, based on integrity and a preset algorithm, but is not limited thereto.

When the path of the preset file is abnormal, the terminal processor 13 may display a warning message on the screen of the DHCP terminal 10 or output a warning sound through a speaker of the DHCP terminal 10 to warn the user that the path of the firmware file is abnormal.

According to the present embodiments, because the security between the DHCP terminal 10 and the DHCP server 30 may be strengthened by encrypting an existing option field value without additional equipment, a more economical and stable network security system 1 may be provided.

The terminal memory 15 stores a preset option field value.

The terminal memory 15 may store a firmware file. The firmware file stored in the terminal memory 15 may be updated.

Meanwhile, the TFTP server 151 may be built into the DHCP terminal 10 or may be accessible by the DHCP terminal 10. The TFTP server 151 may be stored in the terminal memory 15 or may be provided separately from the terminal memory 15, but is not limited thereto.

The TFTP server 151 may store a preset file in a preset location. For example, the TFTP server 151 may store a firmware file in a preset location. In this case, the TFTP server 151 may update the firmware file stored in the preset location or may designate the priority of the latest firmware file as the highest priority.

The TFTP server 151 may transmit a preset file stored in a preset location to the DHCP terminal 10 in response to a request for a preset file from the DHCP terminal 10.

Figure 3:
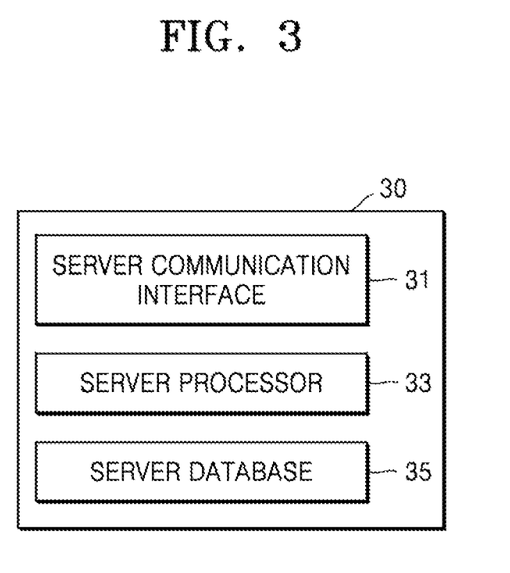
FIG. 3 is a block diagram showing a configuration of a DHCP server, according to an embodiment.

FIG. 3 is a block diagram showing a configuration of the DHCP server 30, according to an embodiment.

The DHCP server 30 includes a server communication interface 31, a server processor 33, and a server database 35.

The server communication interface 31 receives a request for a preset option field value from the DHCP terminal 10.

For example, the server communication interface 31 may receive a DHCP Discover message including a request for a preset option field value from the DHCP terminal 10.

The server communication interface 31 transmits the preset option field value and the encryption information to the DHCP terminal 10.

For example, the server communication interface 31 may send a DHCP Offer message including a preset option field value and encryption information to the DHCP terminal 10.

The server communication interface 31 receives a notification of whether the preset option field value is valid or a notification of whether the preset option field value is invalid from the DHCP terminal 10.

For example, the server communication interface 31 may receive a DHCP Request message including a notification of whether the preset option field value is valid or a notification of whether the preset option field value is invalid from the DHCP terminal 10.

The server communication interface 31 transmits a preset option field value message to the DHCP terminal 10.

For example, the server communication interface 31 may send a preset option field value message including a preset option field value and encryption-free information to the DHCP terminal 10.

For example, the server communication interface 31 may send a preset option field value message including a preset option field value to the DHCP terminal 10.

According to the present embodiment, even when no agreement is made between the DHCP terminal 10 and the DHCP server 30 as to whether encryption is to be performed, the network security system 1 capable of upgrading a firmware file may be provided.

The server communication interface 31 may send a DHCP Ack message to the DHCP terminal 10.

The server processor 33 generates a preset option field value and encryption information in response to a request for a preset option field value from the DHCP terminal 10.

For example, the server processor 33 may generate an option 66 field value, an option 67 field value, and encryption information for the option 66 field value and the option 67 field value.

For example, the server processor 33 may generate a DHCP Offer message including the option 66 field value, the option 67 field value, and encryption information for the option 66 field value and the option 67 field value.

Accordingly, the server processor 33 may generate a DHCP Offer message corresponding to the DHCP Discover message of the DHCP terminal 10.

The server processor 33 generates a preset option field value message including the preset option field value and the encryption-free information, in response to a notification that the preset option field value of the DHCP terminal 10 is invalid.

The server processor 33 may generate a preset option field value message including a preset option field value, in response to a notification that the preset option field value of the DHCP terminal 10 is invalid.

When the server processor 33 receives a notification that the preset option field value is valid from the DHCP terminal 10, the server processor 33 may send a DHCP Ack message to the DHCP terminal 10 via the server communication interface 31.

The server database 35 stores a preset option field value and encryption information.

The server database 35 may store information included in the DHCP Discover message, the DHCP Offer message, the DHCP Request message, the preset option field value message, the DHCP Ack message, etc., which are exchanged with the DHCP terminal 10, to correspond to the DHCP terminal 10.

Figure 4:
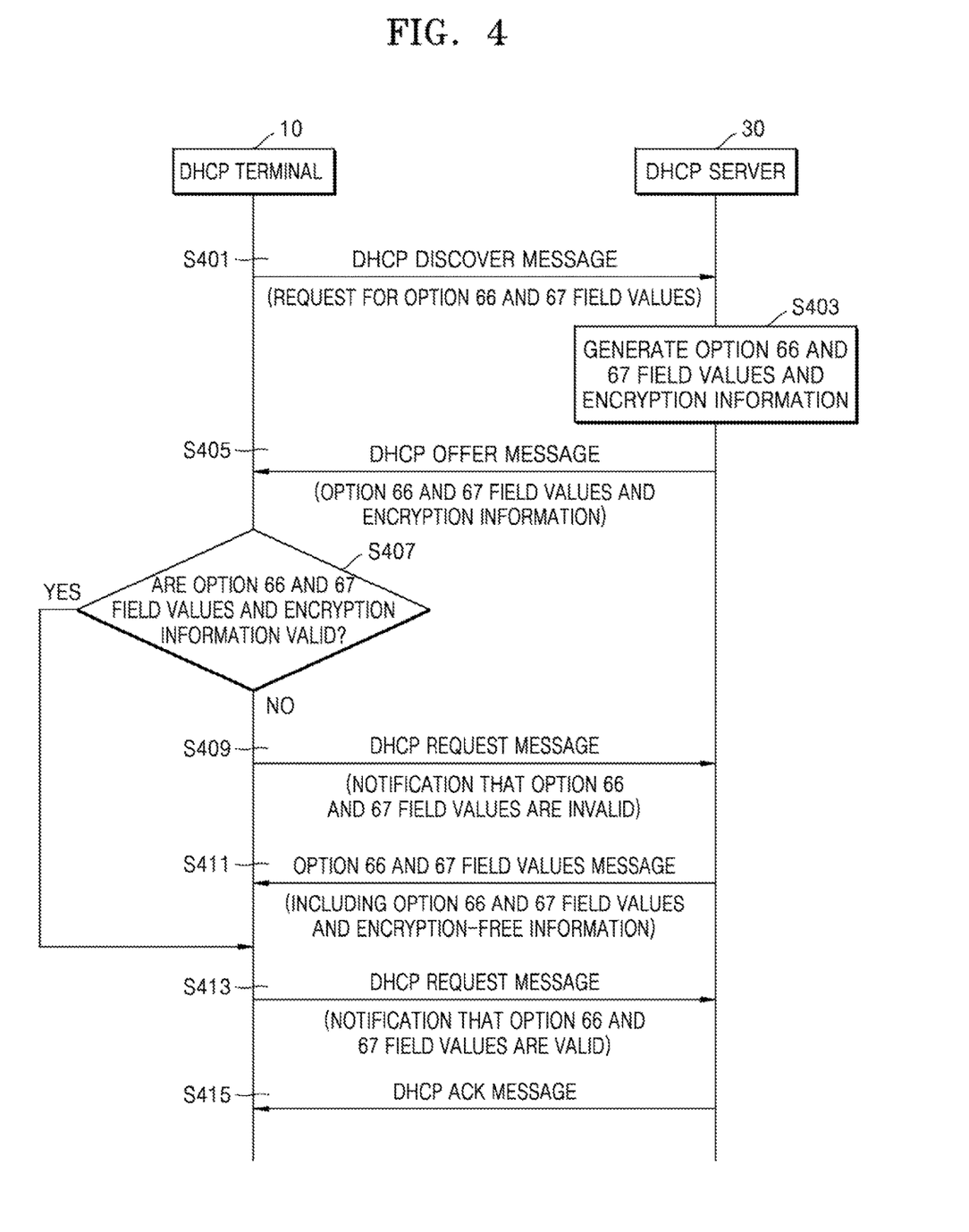
FIG. 4 is a flowchart of an operating method of a network security system, according to an embodiment.

FIG. 4 is a flowchart of an operating method of a network security system, according to an embodiment.

Referring to FIG. 4, the DHCP terminal 10 sends a DHCP Discover message including a request for a preset option field value to the DHCP server 30, in operation S401.

The request for the preset option field value may be a request for an option 66 field value and an option 67 field value.

At this time, the DHCP terminal 10 and the DHCP server 30 may negotiate in advance to extend the use of options 66 and 67 of the DHCP to not only boot, which is the original purpose, but also upgrade firmware files, which is another purpose.

In this case, the request for the preset option field value may further include a request for encryption information for the option 66 field value and the option 67 field value.

The DHCP terminal 10 may broadcast a DHCP Discover message to one or more DHCP servers 30.

Meanwhile, according to a prior agreement between the DHCP terminal 10 and the DHCP server 30, the DHCP terminal 10 may send, to the DHCP server 30, a DHCP Discover message that does not include a request for a preset option field value.

The DHCP server 30 generates a preset option field value and encryption information in response to the DHCP Discover message, in operation S403.

In this case, the preset option field value may be an option 66 field value and an option 67 field value, and the encryption information may be encryption information for the option 66 field value and the option 67 field value.

Meanwhile, according to the prior agreement between the DHCP terminal 10 and the DHCP server 30, the DHCP server 30 may generate a preset option field value and encryption information in response to the DHCP Discover message that does not include the request for the preset option field value.

Subsequently, the DHCP server 30 sends a DHCP offer message including preset option field value and encryption information to the DHCP terminal 10, in operation S405.

The DHCP terminal 10 determines whether the preset option field value and encryption information included in the DHCP offer message are valid, in operation S407.

For example, when the option 66 field value indicates a preset location of the TFTP server 151, the option 67 field value indicates a preset file stored in a preset location of the TFTP server 151, authentication information is correct, and the option 66 field value and the option 67 field value may be decrypted by the encrypted information, the DHCP terminal 10 may determine that the preset option field value and the encryption information are valid.

For example, when the option 66 field value does not indicate a preset location of the TFTP server 151, the option 67 field value does not indicate a preset file stored in a preset location of the TFTP server 151, authentication information is incorrect, and the option 66 field value and the option 67 field value may not be decrypted by the encrypted information, the DHCP terminal 10 may determine that the preset option field value and the encryption information are invalid.

When the preset option field value and encryption information are invalid, the DHCP terminal 10 sends, to the DHCP server 30, a DHCP Request message including a notification that the preset option field value is invalid, in operation S409.

Meanwhile, according to a prior agreement between the DHCP terminal 10 and the DHCP server 30, the DHCP terminal 10 may send, to the DHCP, a DHCP Request message that does not include a notification that the preset option field value is invalid server 30.

In this case, the DHCP server 30 sends, to the DHCP terminal 10, a preset option field value message including a preset option field value and encryption-free information in response to the DHCP Request message, in operation S411.

The preset option field value message of operation S411 may include the same preset option field value as the preset option field value of operation S405, and may not include encryption information of S405, or may include encryption-free information.

Meanwhile, when the preset option field value and encryption information are valid, the DHCP terminal 10 sends, to the DHCP server 30, a DHCP Request message including a notification that the preset option field value is valid, in operation S413.

Meanwhile, the DHCP terminal 10 transmits a DHCP Request message including a notification that the preset option field value is valid to the DHCP server 30 in response to the preset option field value message of S411, in operation S413.

After operation S413 is performed, the DHCP terminal 10 sends a DHCP Ack message to the DHCP server 30, in operation S415.

Accordingly, the DHCP terminal 10 may receive an IP address from the DHCP server 30 and obtain an opportunity to upgrade a firmware file.

Figure 5:
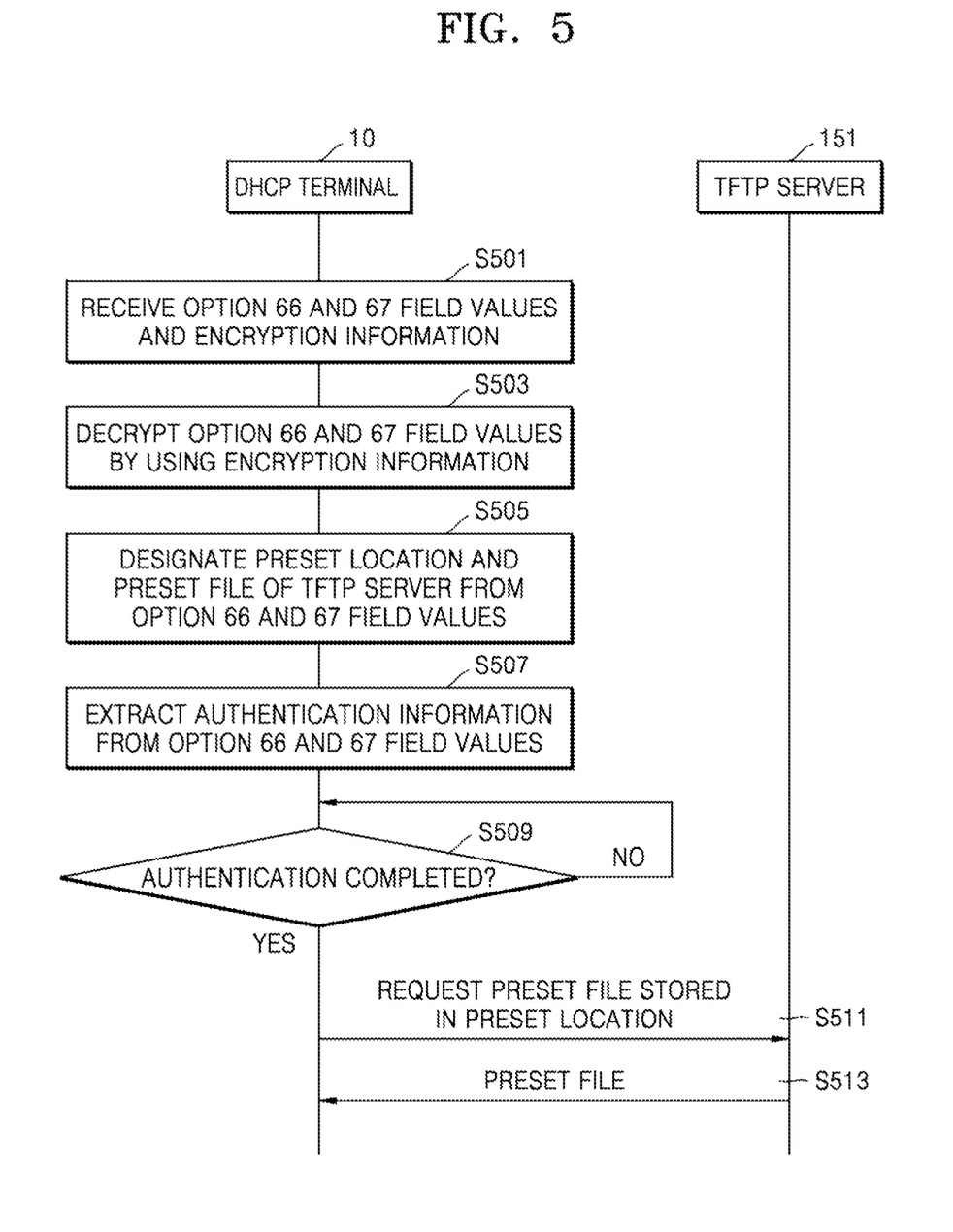
FIG. 5 is a flowchart of an operating method of a network security system, according to an embodiment.

FIG. 5 is a flowchart of an operating method of the network security system 1, according to an embodiment.

Referring to FIG. 5, the DHCP terminal 10 receives the preset option field value and the encryption information, in operation S501 and then, decrypts a preset option field value by using the encryption information, in operation S503.

For example, the DHCP terminal 10 may determine an option 66 field value and an option 67 field value by using the encryption information.

In this case, the encryption information may be unidirectional encryption information or bidirectional encryption information.

When the encryption information includes an encryption key value, the encryption key value may be, according to a prior agreement between the DHCP terminal 10 and the DHCP server 30, a combination of network-related option field values of the DHCP or a fixed preset value, but is not limited thereto.

On the other hand, the encryption information may be formed only in a binary format language. Encryption information including only binary language may be protected against a script hacking attack, and thus, a more stable network security system 1 may be provided.

Meanwhile, the encryption information may include text information according to a prior agreement between the DHCP terminal 10 and the DHCP server 30.

Then, the DHCP terminal 10 designates, from the preset option field value, a preset location and a preset file of the TFTP server 151, in operation S505, and extracts authentication information in operation S507.

For example, the DHCP terminal 10 may designate a preset location of the TFTP server 151 from the option 66 field value, designate a preset file of the TFTP server 151 from the option 67 field value, and extract terminal identification information, which is authentication information.

On the other hand, when the option 67 field value includes two pieces of file identification information, the DHCP terminal 10 may extract preset file identification information other than boot file identification information separated by a delimiter, and designate a preset file of the TFTP server 151 based on the preset file identification information.

Subsequently, when authentication is completed based on the authentication information, in operation S509, the DHCP terminal 10 transmits a request for the preset file stored in the preset location to the TFTP server 151, in operation S511.

For example, the DHCP terminal 10 may access the TFTP server 151 when the terminal identification information included in the option 66 field value and the option 67 field value matches the terminal identification information of the TFTP server 151.

The TFTP server 151, in response to the request for the preset file, transmits the preset file stored in the preset location to the DHCP terminal 10, in operation S513.

Accordingly, the DHCP terminal 10 may upgrade the firmware file based on the preset option field value received through the IP address allocation operation.

Figure 6:
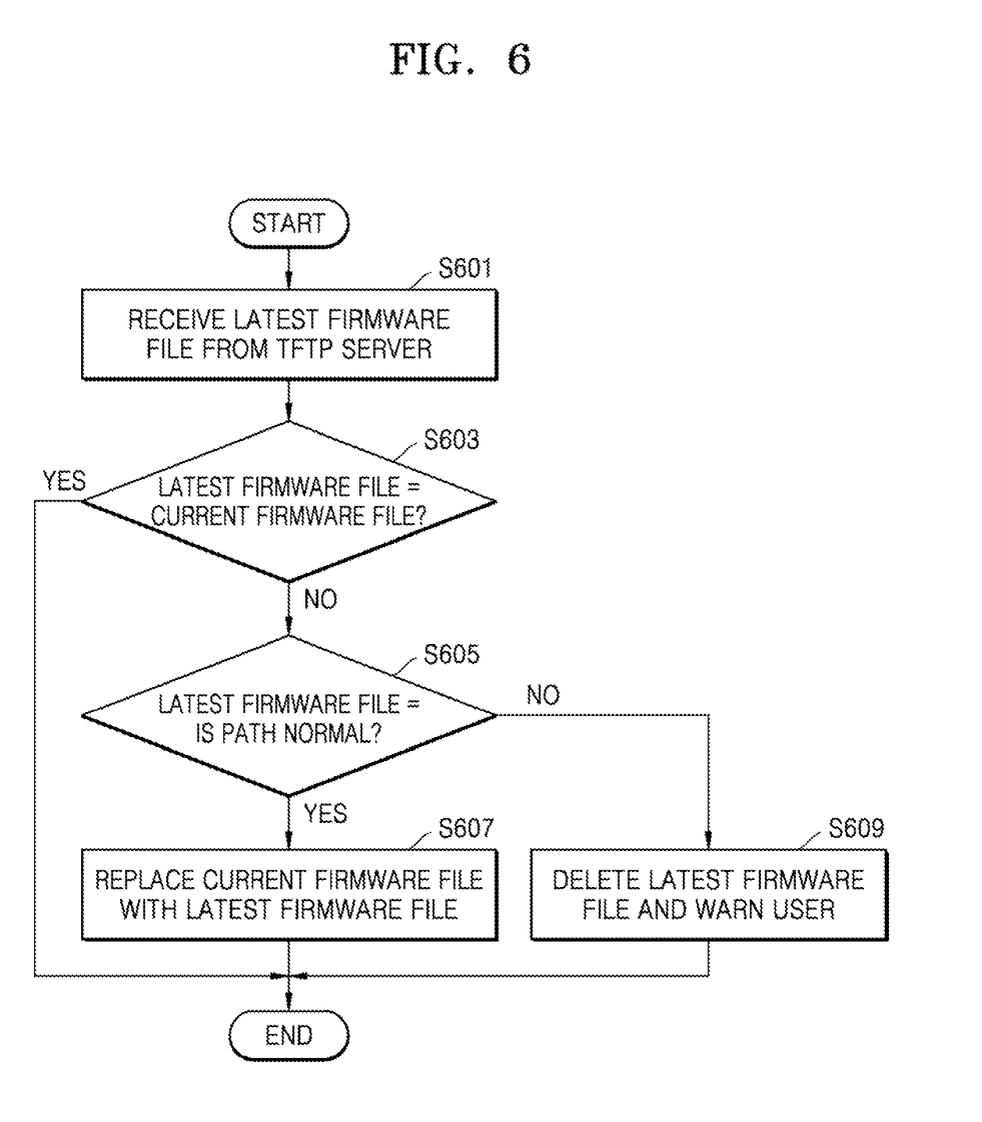
FIG. 6 is a flowchart of a method of upgrading a firmware file of a network security system, according to an embodiment.

FIG. 6 is a flowchart of a method of upgrading a firmware file of the network security system 1, according to an embodiment.

Referring to FIG. 6, the DHCP terminal 10 receives the latest firmware file from the TFTP server 151, in operation S604.

Subsequently, the DHCP terminal 10 determines whether the latest firmware file is the same as a current firmware file stored in the terminal memory 15, in operation S603.

When the latest firmware file is the same as the current firmware file, in operation S603, the DHCP terminal 10 terminates the firmware file upgrade.

When the latest firmware file is different from the current firmware file, in operation S603, the DHCP terminal 10 determines whether the path of the latest firmware file is normal, in operation S605.

For example, the DHCP terminal 10 may determine whether the path of the latest firmware file is normal based on integrity and a preset algorithm.

When the path of the latest firmware file is normal, in operation S605, the DHCP terminal 10 replaces the current firmware file with the latest firmware file, in operation S607.

The DHCP terminal 10 may perform a firmware file upgrade operation by replacing the current firmware file with the latest firmware file.

When the path of the latest firmware file is abnormal, in operation S605, the DHCP terminal 10 deletes the received latest firmware file and warns the user that the path of the latest firmware file is abnormal, in operation S609.

Accordingly, the firmware file may be prevented from being upgraded by a spoofing server and/or a spoofing terminal, and thus, a more strengthened and stable network security system 1 may be provided.

So far, preferred embodiments of the present disclosure are focused on and described. It will be understood by those of ordinary skill in the art to which the present disclosure pertains that the present disclosure may be implemented in a modified form without departing from the spirit of the disclosure.

The embodiments should be considered in descriptive sense only and not for purposes of limitation. The scope of the present disclosure is shown in the claims rather than the above description, and the claims and the equivalents thereof should be construed as being included in the present disclosure.

The invention claimed is:

1. A network security system comprising:
a communication interface that transmits a request for a preset option field value to a Dynamic Host Configuration Protocol (DHCP) server, receives a preset option field value corresponding to the request for the preset option field value from the DHCP server, transmits a request for a preset file to a Trivial File Transfer Protocol (TFTP) server, and receives a preset file corresponding to the request for the preset file from the TFTP server;
a processor that designates a preset location and the preset file of the TFTP server based on the preset option field value, wherein the preset file comprises a file different from a file specified in the preset option field value by the DHCP; and
a memory in which a current file is stored, wherein the processor compares the preset file with the current file stored in the memory, and when the preset file is different from the current file, replaces the current file with the preset file;
wherein the processor determine whether a path of the preset file is normal, deletes the preset file when the path of the preset file is abnormal, and replaces the current file with the preset file when the path of the preset file is normal.

2. The network security system of claim 1, wherein the request for the preset option field value is included in a DHCP Discover message, and
the preset option field value is included in a DHCP offer message.

3. The network security system of claim 1, wherein the preset option field value comprises an option 66 field value and an option 67 field value, and
a file specified in the option 67 field value by the DHCP comprises a boot file.

4. The network security system of claim 3, wherein the processor extracts IP address information indicating the preset location from the option 66 field value, and extracts file identification information indicating the preset file from the option 67 field value, thereby designating the preset location and the preset file.

5. The network security system of claim 4, wherein
the file identification information comprises one piece of file identification information when a remote boot system is not used, and comprises two pieces of file identification information separated by a delimiter, when the remote boot system is used,
the one piece of file identification information comprises preset file identification information indicating the preset file, and the two pieces of file identification information comprises the preset file identification information and boot file identification information indicating the boot file, respectively.

6. The network security system of claim 1, wherein the preset option field value is encrypted by encryption information,
the communication interface receives the encryption information corresponding to the request for the preset option field value from the DHCP server, and
the processor designates the preset location and the preset file by decrypting the preset option field value by using the encryption information.

7. The network security system of claim 6, wherein the request for the preset option field value is included in a DHCP Discover message, and
the preset option field value and the encryption information are included in a DHCP offer message.

8. The network security system of claim 6, wherein the communication interface transmits, to the DHCP server, a notification that a preset option field value is invalid or a notification that a preset option field value is valid, and receives, from the DHCP server, the preset option field value and encryption-free information, which correspond to the notification that the preset option field value is invalid, and
the processor determines whether the encryption information is valid, and when the encryption information is invalid, transmits a notification that the preset option field value is invalid to the DHCP server through the communication interface, and when the encryption information is valid, transmits a notification that the preset option field value is valid to the DHCP server through the communication interface in response to the preset option field value and the encryption-free information.

9. The network security system of claim 8, wherein the notification that the preset option field value is invalid or the notification that the preset option field value is valid is included in a DHCP Request message, and
the communication interface receives, from the DHCP server, a DHCP Ack message corresponding to a DHCP Request message that includes the notification that the preset option field value is valid.

10. The network security system of claim 6, wherein the encryption information comprises at least one of a hash algorithm, a hash value, an encryption key value, and timestamp information, and
the timestamp information comprises information on a time when encryption and decryption are possible.

11. The network security system of claim 1, wherein the processor extracts authentication information from the preset option field value, and transmits the request for the preset file to the TFTP server through the communication interface when the authentication information is same as terminal identification information indicating the TFTP server.

12. The network security system of claim 1, wherein the preset file comprises a firmware file.

13. The network security system of claim 1, wherein the communication interface periodically transmits the request for the preset option field value to the DHCP server.

14. The network security system of claim 1, wherein the communication interface transmits the request for the preset option field value to the DHCP server whenever the network security system is booted.

15. An operating method of a network security system, the operating method comprising:

transmitting, by a communication interface, a request for preset option field value to a Dynamic Host Configuration Protocol (DHCP) server;
receiving, by the communication interface, a preset option field value and encryption information from the DHCP server, the preset option field value and the encryption information corresponding to the request for the preset option field value;
designating, by a processor, a preset location and a preset file of a Trivial File Transfer Protocol (TFTP) server, based on the preset option field value;
transmitting, by the communication interface, a request for a preset file to the TFTP server;
receiving, by the communication interface, a preset, file from the TFTP server, the preset file corresponding to the request for the preset file;
comparing, by the processor, the preset file with a current file stored in a memory;
when the preset file is different from the current file, replacing, by the processor, the current file with the preset file, wherein the preset file comprises a file different from a file specified in the preset option field value by the DHCP; and
determining whether a bath of the preset file is normal, deleting the preset file when the path of the preset file is abnormal, and replacing the current file with the preset file when the path of the preset file is normal.

16. The operating method of claim 15, further comprising:
determining, by the processor, whether the preset option field value and the encryption information are valid;
when the preset option field value and the encryption information are valid, transmitting, by the processor, a notification that the preset option field value is valid to the DHCP server through the communication interface;
when the preset option field value and the encryption information are invalid, transmitting, by the processor, a notification that the preset option field value is invalid to the DHCP server through the communication interface;
receiving, by the communication interface, the preset option field value from the DHCP server, the preset option field value corresponding to the notification that the preset option field value is invalid; and
transmitting, by the processor, a notification that a preset option field value is valid to the DHCP server through the communication interface, in response to preset option field value.

17. The operating method of claim 15, wherein the transmitting of the request for the preset file to the TFTP server comprises:
extracting, by the processor, authentication information from the preset option field value;
determining, by the processor, whether the authentication information is same as terminal identification information indicating the TFTP server; and
when the authentication information is same as the terminal identification information indicating the TFTP server, transmitting, by the communication interface, the request for the preset file to the TFTP server.

18. A network security system comprising:
a communication interface that transmits a request for a preset option field value to a Dynamic Host Configuration Protocol (DHCP) server, receives a preset option field value and encryption information from the DHCP server, the preset option field value and encryption information corresponding to the request for the preset option field value, transmits a request for a preset file to a Trivial File Transfer Protocol (TFTP) server, and receives a preset file corresponding to the request for the preset file from the TFTP server;

a processor that designates a preset location and the preset file of the TFTP server by decrypting the preset option field value by using the encryption information, wherein the encryption information comprises at least one of a hash algorithm, a hash value, an encryption key value, and timestamp information, and the timestamp information comprises information on a time when encryption and decryption are possible; and a memory in which a current file is stored, wherein the processor compares the preset file with the current file stored in the memory, and when the reset file is different from the current file, replaces the current file with the preset file;

wherein the processor determines whether a path of the preset file is normal, deletes the preset file when the path of the preset file is abnormal, and replaces the current file with the preset file when the path of the preset file is normal.

* * * * *